J. H. BRUEN.
Hand-Seeder.
No. 16,677. Patented Feb. 24, 1857.
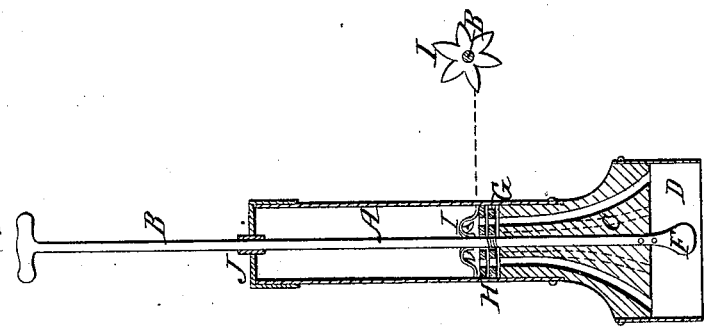
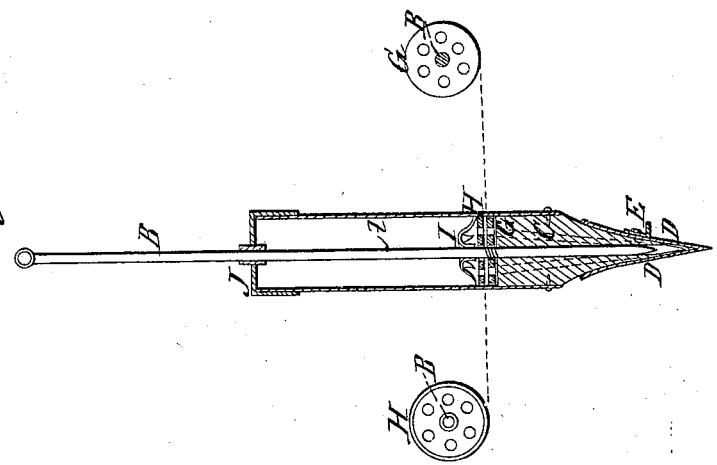
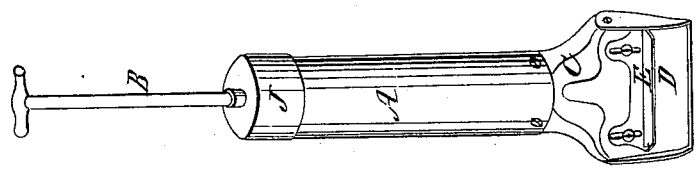

UNITED STATES PATENT OFFICE.

JOHN H. BRUEN, OF PENN YAN, NEW YORK.

IMPROVEMENT IN HAND SEED-PLANTERS.

Specification forming part of Letters Patent No. 16,677, dated February 24, 1857.

*To all whom it may concern:*

Be it known that I, JOHN H. BRUEN, of Penn Yan, in the county of Yates and State of New York, have invented a new and useful Improvement in Seed-Planters; and I do hereby declare that the following is a full, clear, and exact description of the same, reference being had to the accompanying drawings, making a part of this specification, in which—

Figure 1 is an external view of the whole machine; Figs. 2 and 3, transverse elevations, showing the internal construction of the same.

The letters have reference to the same parts in each figure.

A is the holder for the seed, also to hold the diaphragm and the part C. It may be made of sheet metal and of any required size or shape; but a cylindrical shape is preferable.

B is a rod or staff passing through the cover J and holder A and diaphragm H to the part F. On this rod is a distributing-cylinder, G, attached; also, a convenient handle at the upper end.

C is made of wood, or may be made of metal, and it is fastened to the lower end of the holder A by screws or otherwise. The upper end is below the diaphragm H the distance of the thickness of the cylinder G. It has holes corresponding at the upper end with the holes in the diaphragm and distributing-cylinder. These holes terminate at the lower end in a line, as represented in Fig. 3.

D are the blades for penetrating the earth. They should be made of steel. The upper part should extend upward enough to form a spring, as represented in Fig. 1. The blades are bent around the corners of the part C, so that the part of one overlaps the other, each part having a hole through which a pin or bolt is passed to secure them to the part C, thereby forming a hinge-joint.

E is a regulator to regulate the depth the seed is to be deposited. It is adjustable and attached to one of the blades D, and, if necessary, one may be put on each blade. F is attached to the lower end of the staff, and serves to open the blades by turning partly around. This motion opens the blades when they are properly placed where the seed should be deposited. The blades may be withdrawn without depositing the seed if the operator wishes to do so.

G is a distributing-cylinder attached to the staff B, and is perforated with holes corresponding with the holes in the diaphragm, or may be less in number, if required. When the seed is to be deposited the staff is turned, thereby bringing the holes in the cylinder over the holes in the part C and opening the blades so that the seed will drop into the earth.

I is an attachment to the staff above the diaphragm. Its use is to stir the seed in the holder, thereby preventing clogging.

What I claim as my invention, and desire to by Letters Patent, is—

1. The thin broad extremity F, or its equivalent, at the lower end of the rod B, acting as a cam to open the blades by giving said rod a partial turn with the hand, substantially as specified.

2. In combination with the above, the arrangement of the seed-distributer G on the rod B, whereby the seed is made to drop simultaneously and only with the opening of the blades, as described.

3. The star or coral shaped attachment I of B, operating, as described, so as to insure the regular action of the seed-distributer.

JOHN H. BRUEN.

Attest:
JAS. BURNS,
GEO. R. CORNWELL.